United States Patent [19]

Nelson et al.

[11] Patent Number: 5,475,840
[45] Date of Patent: Dec. 12, 1995

[54] HIGH PERFORMANCE DYNAMIC LINKING THROUGH CACHING

[75] Inventors: Michael N. Nelson, San Carlos; Graham Hamilton, Palo Alto, both of Calif.

[73] Assignee: Sun Microsystems, Inc., Mountain View, Calif.

[21] Appl. No.: 46,827

[22] Filed: Apr. 13, 1993

[51] Int. Cl.[6] ........................... G06F 120/08; G06F 9/00
[52] U.S. Cl. .................................. 395/700; 364/DIG. 1; 364/280.0; 364/243.41; 395/446
[58] Field of Search ........................... 395/700; 364/280, 364/243.41, DIG. 1

[56] References Cited

U.S. PATENT DOCUMENTS 5,269,021  12/1993  Denio et al. ........................... 395/700

OTHER PUBLICATIONS

"OS/2 Dynamic Link Libraries", Ray Duncan. 1989 Programmer's Journal 7.2. pp. 40–47.
Shared Libraries in SunOS by Robert A. Gingell, et al., Proceedings of the Summer of 1987 USENIX Conference, Jun. 8–12, 1987, pp. 131–145.
Linkers and Loaders by Leon Presser and John R. White, Computing Surveys, vol. 4, No. 3, Sept. 1972, pp. 149–167.
Encyclopedia of Computer Science, 3rd Ed., edited by Anthony Ralston and Edwin D. Reilly, pp. 18, 92–93 206–207, 753, 768–770.
Operating System Concepts, 3rd Ed. by Abraham Silbershatz, James L. Peterson and Peter B. Galvin, Addison—Wesley 1991, pp. 230 and 230–234.
High Performance Dynamic Linking Through Coaching, by M. N. Nelson and Graham Hamilton, Sun Inc., Apr. 1993.

Primary Examiner—David K. Moore
Assistant Examiner—A. Katbab
Attorney, Agent, or Firm—Kang S. Lim

[57] ABSTRACT

A method is disclosed for a method to dynamically link a new program image and related library programs into an executable application program image. The method provides for producing a linked list of the required programs by giving the linker an argument representing the designated program image and a naming context which contains data on the associated library programs which are to be linked together. The linker finds all of the required programs, and links them together. The parent maps the program images into the designated addresses thereby completing the linking of the executable application program. In finding the required programs, the linker first checks the image cache to see if the new program and its related library programs is already linked and cached because it was executed before. If the new program is not found in the image cache, the linker object then checks the library program cache to see if the library programs are cached in partially linked form, and will use as many of these as it can find. For any library programs that must still be located, the linker will retrieve them from a data store and will then proceed to link all library programs and the new program image together to form an executable whole. This process of caching new program images with their library programs and caching partially linked library programs individually guarantees a procedure which minimizes the time delay in program start-up when a new program is executed.

42 Claims, 10 Drawing Sheets

HIGH PERFORMANCE DYNAMIC LINKING THROUGH CACHING

BACKGROUND OF THE INVENTION

1. Field of the Invention

The present invention relates to the fields of distributed computing systems, client-server computing and object oriented programming.

2. Background

A computer programmer writes a program, the source program, in a high level language which typically makes use of symbols for addresses, and special characters or acronyms for operation codes. This source code comprises a set of instructions for the computer and data with which or upon which the instructions are to operate. These instructions and data must be loaded into a computer's memory at certain addresses in order for the computer to execute the program process. In order to make this happen, the source code is processed by a compiler which generates binary object code which a computer can execute. Before the computer can execute this newly written program, the program must go through several additional steps, during which the addresses in the program may be represented in different ways. The compiler typically will bind the symbolic addresses of the source code to relocatable addresses (such as 16 bytes from the beginning address of the program). A linkage editor or loader will in turn bind these relocatable addresses to absolute addresses (such as memory location 64216). Each binding is a mapping from one address space to another. This binding of instructions and data to memory addresses can be done either at compilation time, load time or at program execution time.

Figure 1:
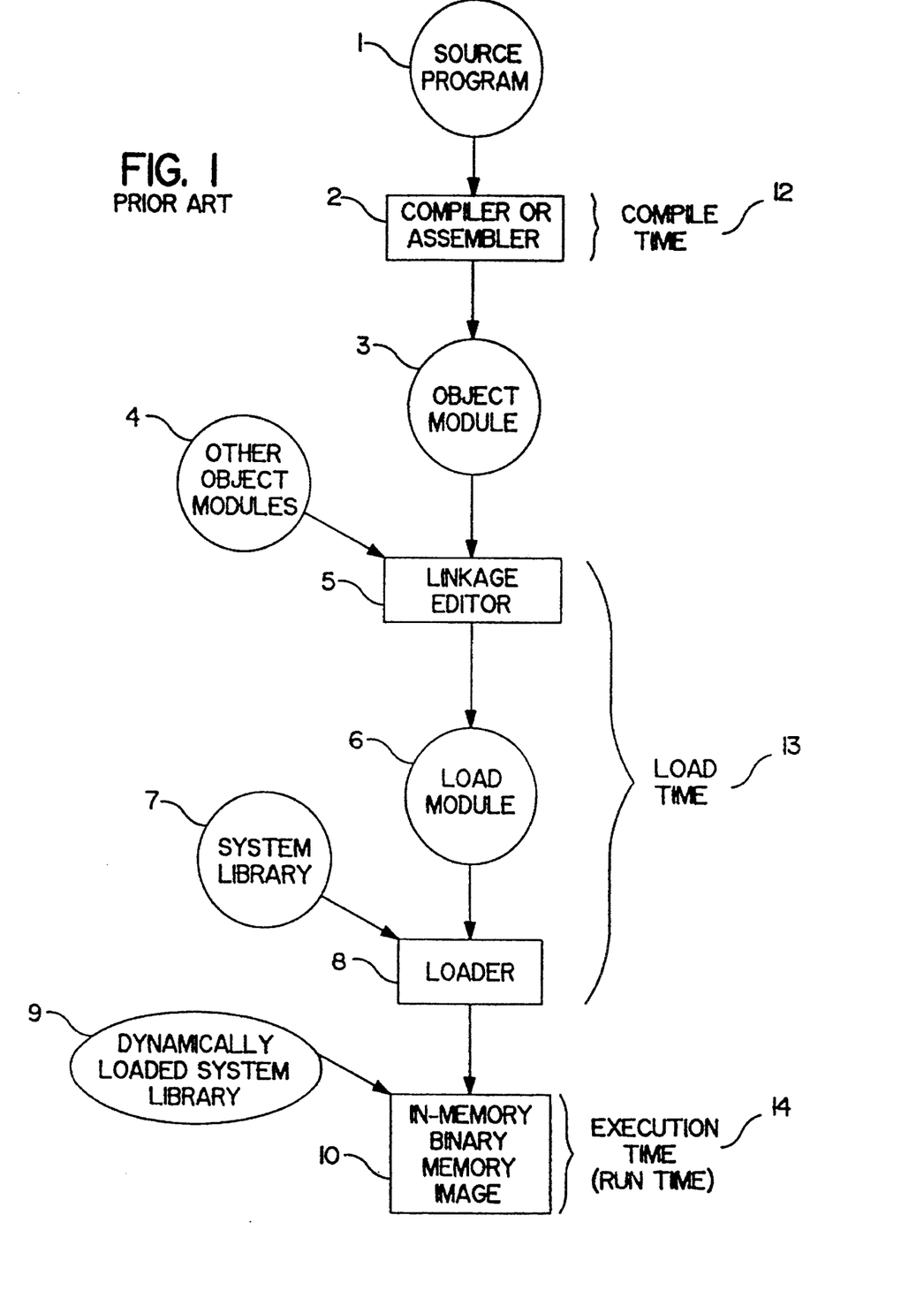
FIG. 1 illustrates the typical steps in compiling and loading a new program (Prior Art).

Referring to FIG. 1, the several steps described above are depicted. The source program 1 is processed by a compiler 2 producing an object code module 3. This object code module 3, generally along with other previously compiled object modules 4, is processed by a linkage editor 5 to produce a load module 6. The load module 6 and any system libraries 7 required are processed by a loader 8 producing an in-memory binary image 10 of the original program and its related modules and libraries. This in-memory binary image 10 can now be executed by the computer.

Continuing to refer to FIG. 1, when it is known at compile time 12 where the program will reside in memory, these programs are compiled with absolute code for addresses. In most cases however, it is not known at compile time where the program will reside in memory, and the compiler must generate relocatable code for the memory addresses. In this case, final binding of memory locations to the addresses is delayed until either load time 13 or execute time 14. Some modern systems delay such address binding until execute time 14 when the program image can be moved during its execution from one memory segment to another or where the program start-up cost is not excessive because the program images contain few relocatable addresses, such as with position independent code (PIC). PIC is code generated by some compilers which can be placed anywhere in memory because all memory references are made relative to the program counter.

Modern computer operating systems are designed to optimize the use of memory space and to minimize user wait time. This is done in the address binding/program loading process, by dynamic loading of program object modules only when they are actually called by another module and dynamic linking of an object module to its system library routines only when they are required. In these cases the main program is loaded into memory and executed and supporting object modules or system libraries are not loaded unless they are called by the main program, thus saving memory space and load time at the expense of some program start-up time. Also, system libraries which will likely already be resident in memory can be dynamically linked to the executing main program when called, thereby not requiring a copy of the system libraries to be linked and loaded with each main program at load time, again saving memory space but at the cost of some program start-up time and some execution time. With dynamic linking, a stub is included in the image for each library-routine reference. This stub is a small piece of code that indicates how to locate the appropriate memory-resident library routine. When the stub is executed it replaces itself with the address of the routine and executes the routine. Under this scheme all programs that use a library routine use the same copy of the library code.

In order to take maximum advantage of dynamic linking and loading, program compilers must be designed to produce the necessary relocatable address references, the subroutine stub code, and efficient PIC code. Unfortunately, existing compilers for object-oriented program modules cannot generate such code efficiently. For example, the cfront 3.0 preprocessor and the G++ compiler generate virtual function tables as initialized data structures which are full of references to relocatable symbols. Thus the number of relocatable symbols in object-oriented program modules is much higher than in more traditional program modules and the program startup delay required to dynamically link these modules can rise to unacceptable levels due to the number of relocations. Therefore what is required is a system that provides efficient dynamic linking of program modules with large numbers of relocatable symbols.

The present invention provides an elegant solution to this problem by caching linked program images and also caching partially linked library programs.

SUMMARY OF THE INVENTION

The present invention fills this need for minimizing the system delay caused by linking new object oriented programs by establishing an elegant and efficient system of caching fully bound program images along with their system library modules, and establishing a second level of caches for caching relocatable system library programs whose addresses are provisionally fixed-up (partly linked), and using these caches to supply fully linked or partially linked modules when a call to another program/routine is made. Thus if a new application is to be linked, the system first checks the image cache to see if the program has been linked before and if so the linked version of the program along with its linked library programs is used without further processing overhead. If the new application is not found in the image cache, then an attempt is made to minimize the overhead by seeing if some or all of the related library programs have already been provisionally fixed-up (partly linked), by checking a library program cache. Only if a library program is not found in the library program cache, does the linker system need to do a complete program load and link operation, thus minimizing the linking overhead.

A method is disclosed for a method to dynamically link a new program image and related library programs into an executable application program image. The method provides for producing a linked list of the required programs by giving the linker an argument representing the designated program image and a naming context which contains data on the associated library programs which are to be linked together. The linker finds all of the required programs, and links them together. The parent maps the program images into the designated addresses thereby completing the linking of the executable application program. In finding the required programs, the linker first checks the image cache to see if the new program and its related library programs is already linked and cached because it was executed before. If the new program is not found in the image cache, the linker object then checks the library program cache to see if the library programs are cached in partially linked form, and will use as many of these as it can find. For any library programs that must still be located, the linker will retrieve them from a data store and will then proceed to link all library programs and the new program image together to form an executable whole. This process of caching new program images with their library programs and caching partially linked library programs individually guarantees a procedure which minimizes the time delay in program start-up when a new program is executed.

DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

In the following description, for purposes of explanation, specific data and configurations are set forth in order to provide a thorough understanding of the present invention. The preferred embodiment described herein is implemented as a portion of the SPRING Object-Oriented Operating System created by Sun Microsystems®, Inc. (Sun Microsystems is a registered trademark of Sun Microsystems, Inc.) However, it will be apparent to one skilled in the art that the present invention may be practiced without the specific details and may be implemented in various computer systems and in various configurations, or makes or models of tightly-coupled processors or in various configurations of loosely-coupled multiprocessor systems. Moreover, it will be clear to those skilled in these arts that the present invention may be implemented in a non-object oriented computing system.

A SPRING domain is an address space with a collection of threads. A given domain may act as the server of some objects and the clients of other objects. The implementor or object manager and the client can be in the same domain or in a different domain.

The spring object model

SPRING has a slightly different way of viewing objects from other distributed object oriented systems and it is necessary to clarify this before discussing the details of the present invention.

Figure 2A:
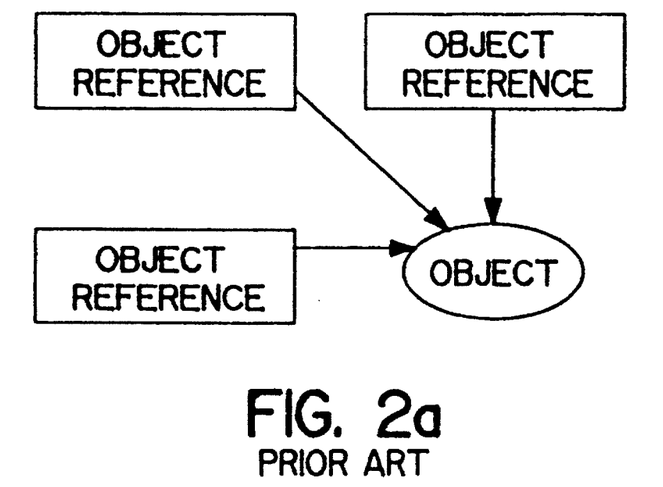
FIG. 2 illustrates the SPRING operating system concept of an Object.

Most distributed systems present a model wherein objects reside at server machines and client machines possess object handles that point to the object at the server. (See FIG. 2a.) Clients pass around object handles rather than objects.

Figure 2B:
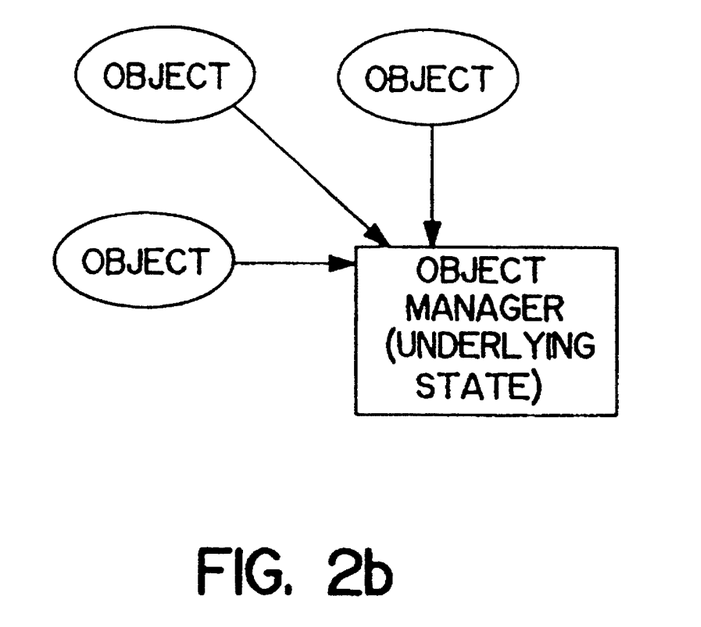

SPRING presents a model wherein clients are operating directly on objects, not on object handles. (See FIG. 2b.) Some of these objects happen to keep all their interesting state at some remote site, so that their local state merely consists of a handle to this remote state. An object can only exist in one place at a time, so if an object is transmitted to someone else then the transmitter of the object ceases to have the object. However, the object can be copied before being transmitted, which might be implemented such that there are now two distinct objects pointing to the same remote state.

So whereas in systems such as MACH, one might talk of several clients having object handles that reference some remote object, in SPRING one would talk about several clients having objects that reference the same remote state.

Dynamic Linking of Process Images in SPRING

Figure 3:
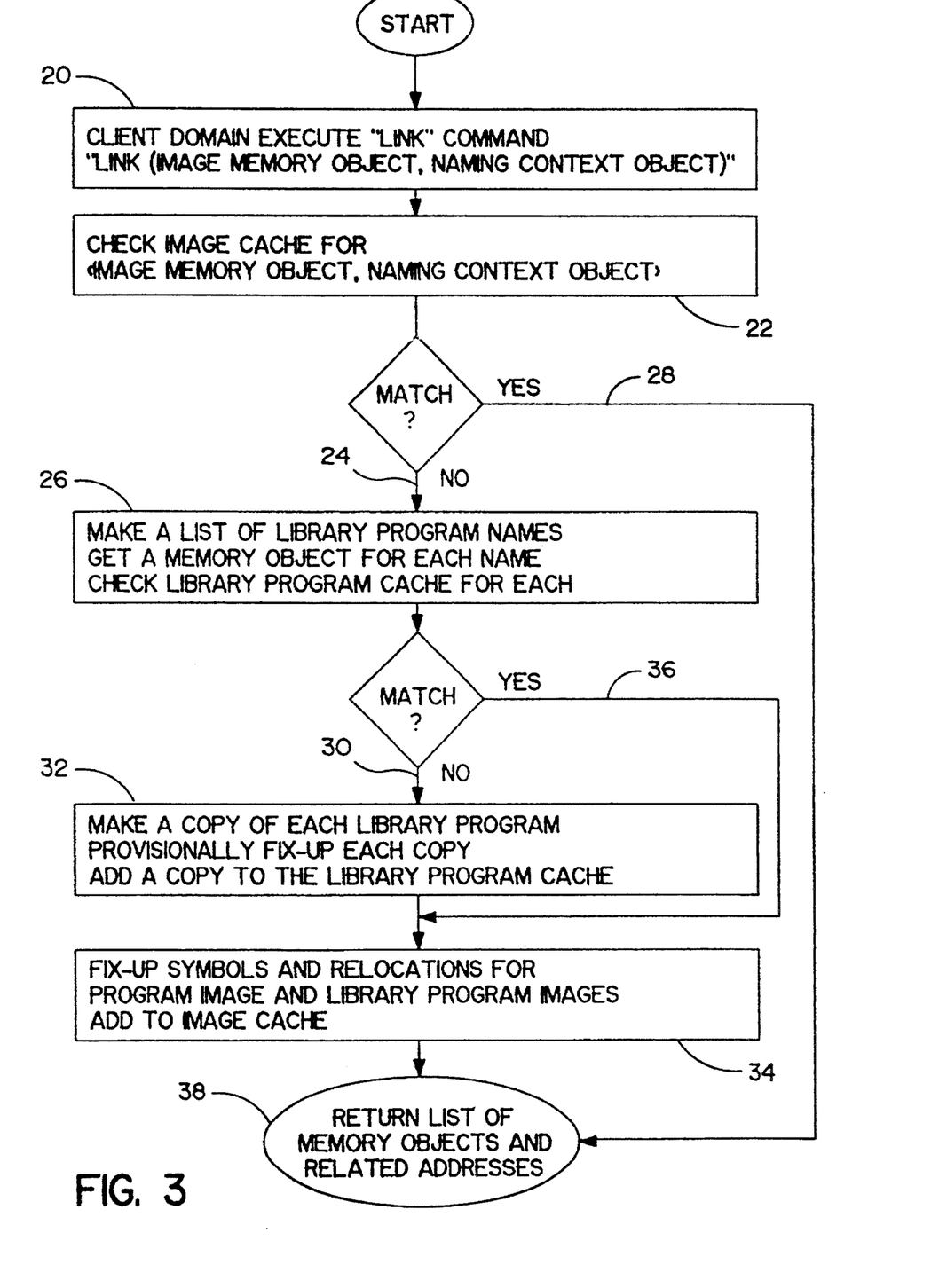
FIG. 3 illustrates a High level flow chart of the invention.
Figure 4A:
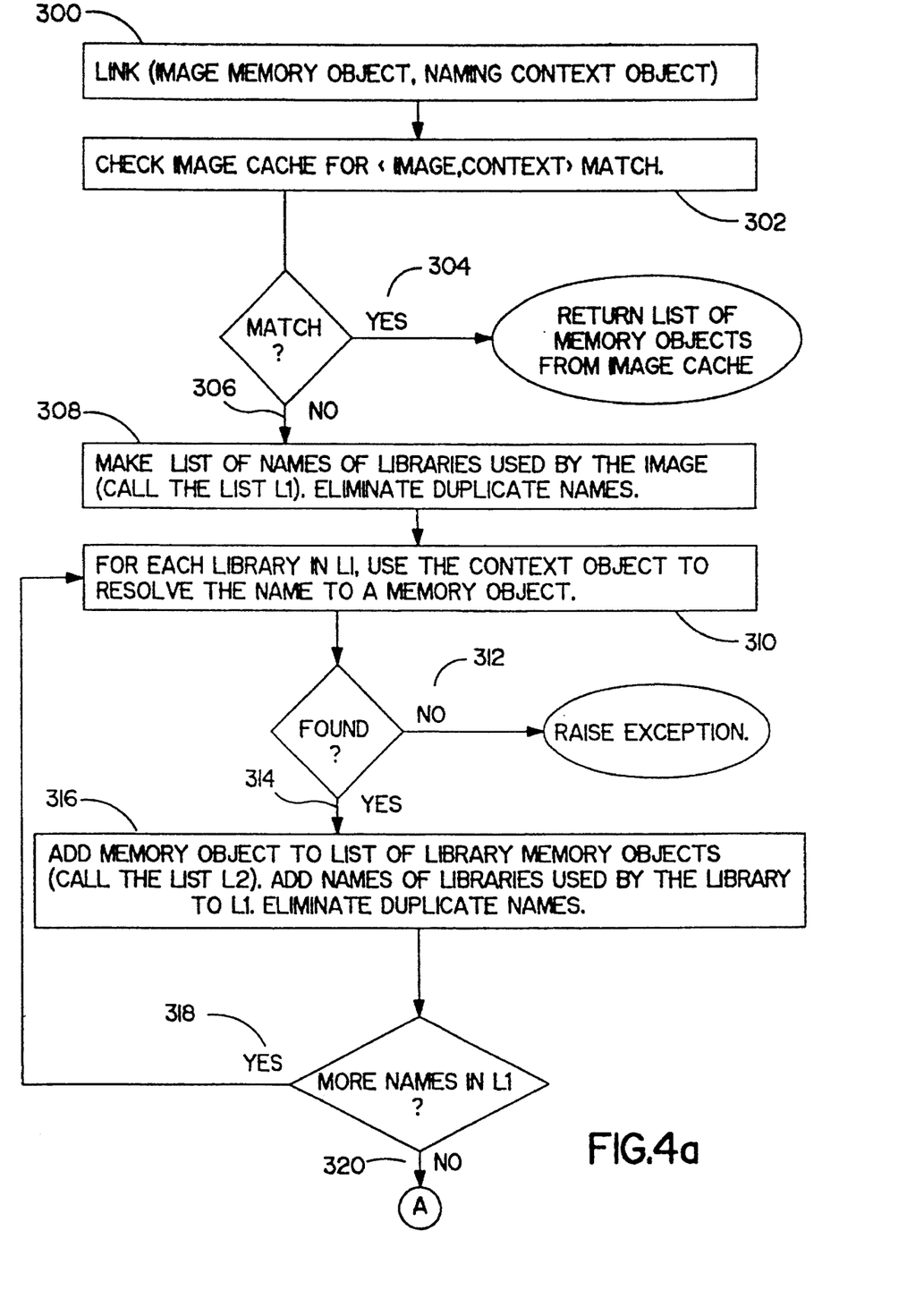
FIG. 4 illustrates a detailed flow chart of the invention.
Figure 4B:
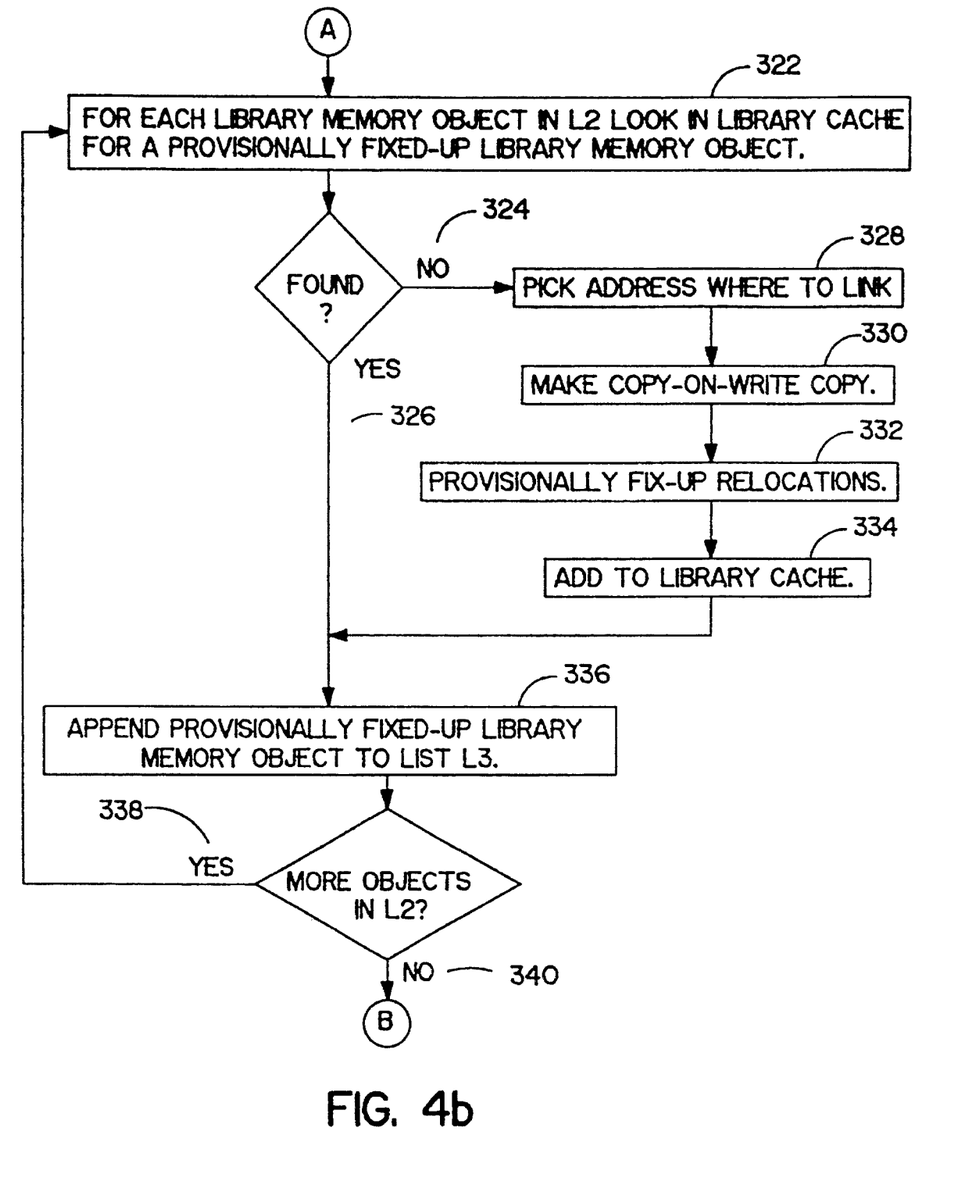
Figure 4C:
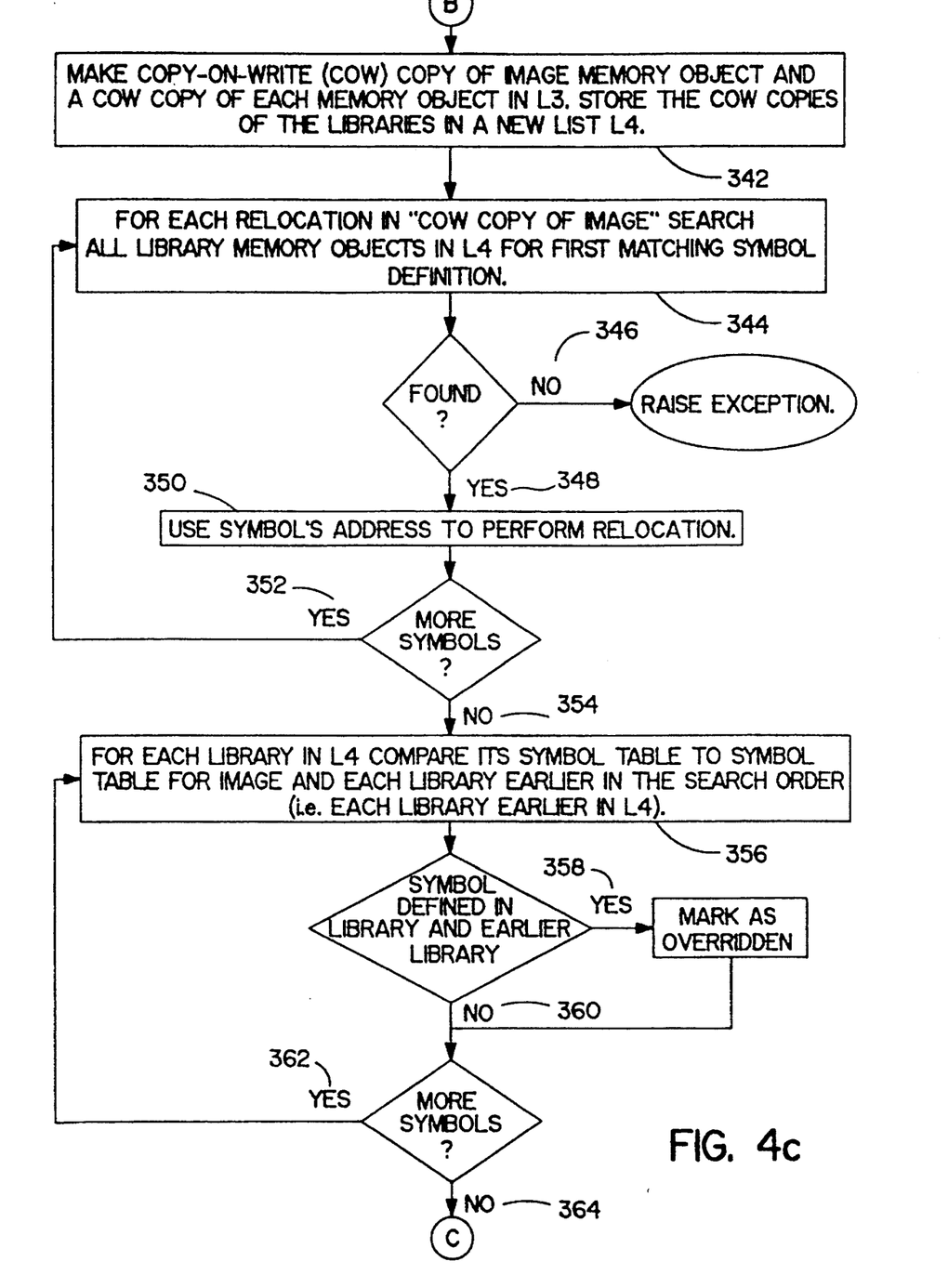
Figure 4D:
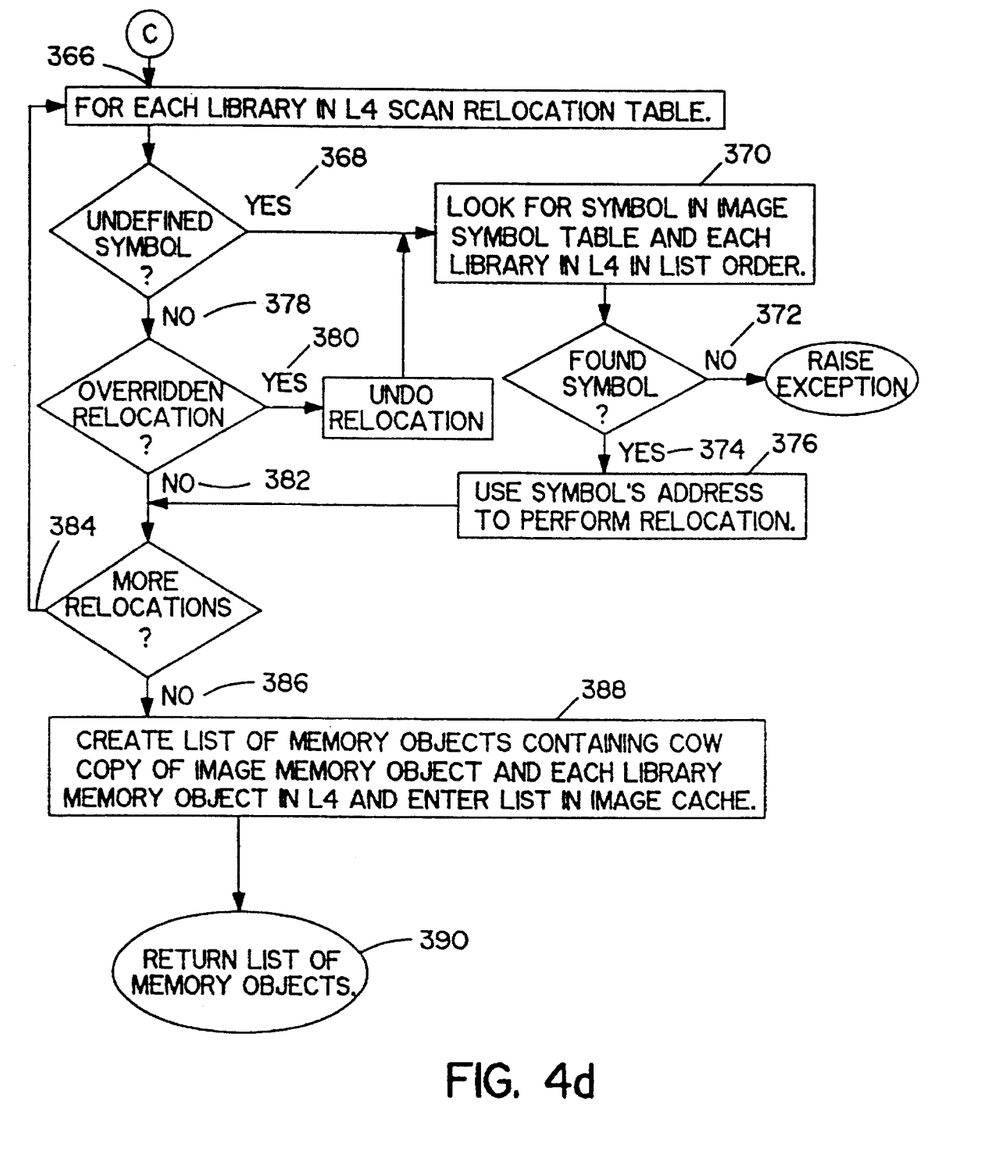

Referring now to FIG. 3 the basic steps of the present invention are briefly described. When a client domain in SPRING wishes to start a program, the client domain executes a "Link (Image Memory Object, Naming Context Object)" command 20 on a linker object. The linker object first checks his image cache 22 by looking-up the image memory object to see if it contains a fully-linked version of the program represented by the image memory object and that this cached version was linked using the library programs in the naming context object. If a match is found 28 the linker object is basically finished with its work and merely returns the cached list of memory objects and related addresses 38 which are associated with the found image memory object. If the check of the image cache produces no match 24 then the linker object finds a list of names of the library programs required by the image memory object and using the naming context object, obtains a memory object associated with each library program, and proceeds to check the library program cache for a match for each library program 26. If a match is found for a library program memory object 36 the linker object obtains the memory object representing the provisionally fixed-up copy of the found library program and the associated address at which this program is to be mapped. If no match is found 30, the linker object decides on an address at which to map the library program in question, creates a memory object that is a copy-on-write copy of the library program in question and maps this memory object at the address it selected for it. The linker object further provisionally fixes-up this new copy of the program and stores the library program's memory object and related address in the library program cache 32. After finding a memory object for each library program required, whether they were found in the library program cache or new copies created, the linker object now resolves all unresolved symbol references in the new program image and in all of these library programs and writes a copy of this fully-linked version into the image cache 34. Lastly the linker object returns to the client domain a list of the memory objects and related addresses for this fully-linked new program image and its associated library programs.

The above description is a summarized description of the present invention which is explained in more detail in the flow chart depicted in FIG. 4 and described in examples of the process below. Those skilled in the art will recognize that the use of names such an linker object, client domain etc. are for illustrative purposes and that the invention may be practiced by programs which may be called any kind of name.

Figure 5:
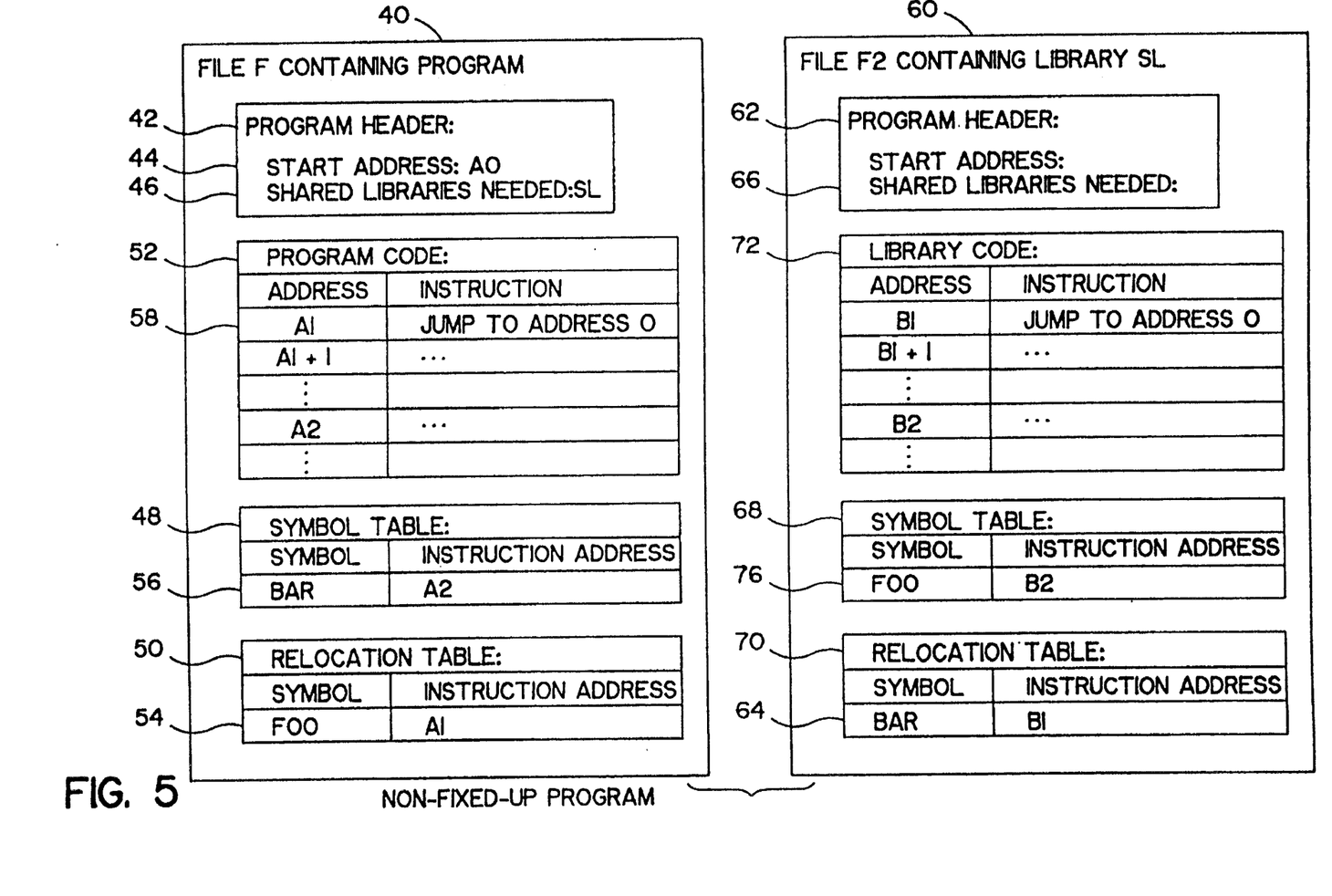
FIG. 5 illustrates a non-fixed-up program.
Figure 6:
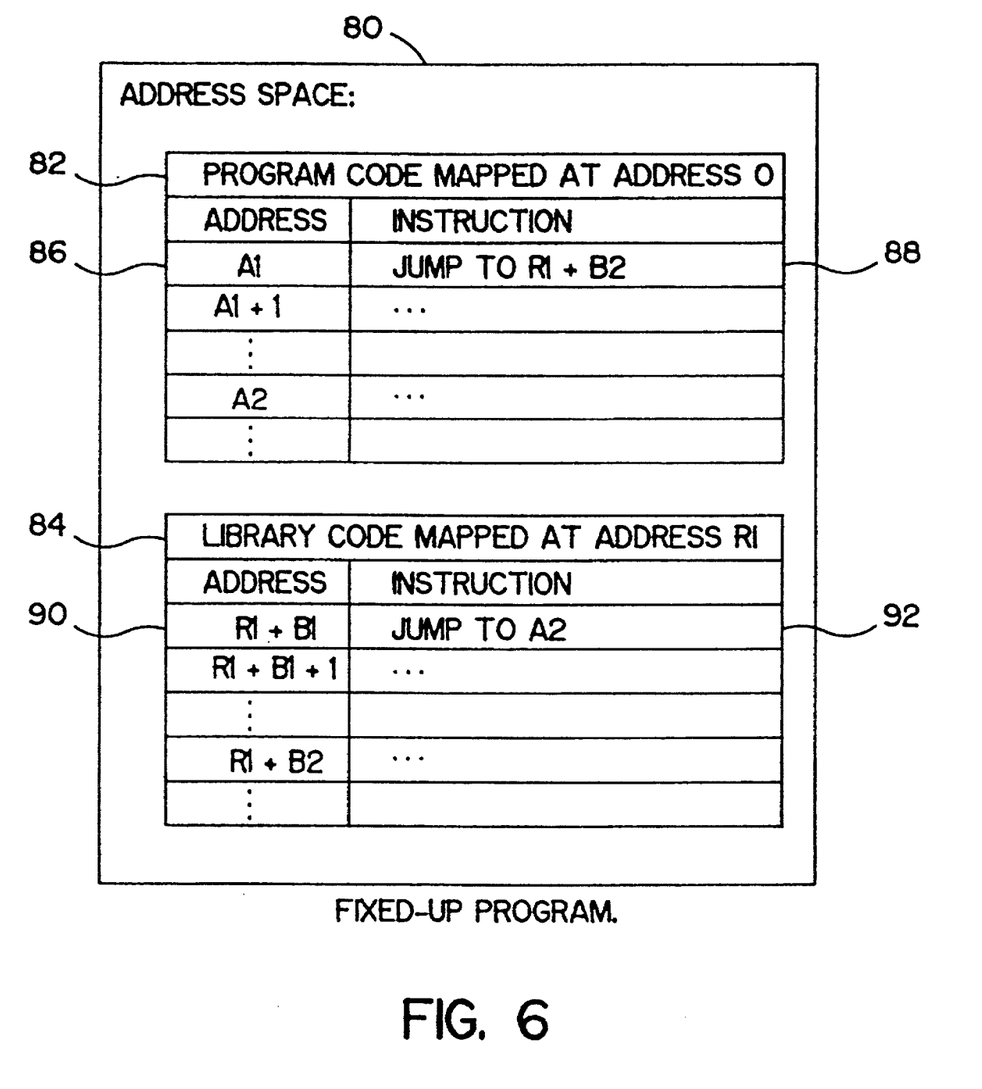
FIG. 6 illustrates a fixed-up version of the program shown in FIG. 5.

Before proceeding to explain the invention in more detail, it is useful to describe an example of a "non-fixed-up program" and what happens as the relocations occur to make it a "fixed-up" or executable program image. Referring now to FIG. 5 a non-fixed-up program is depicted. File F 40 contains a program image. The file has four parts: a header 42 that contains the address 44 to begin executing the program and the list of shared library programs 46 to use; the code for the program 52; a symbol table 48 that contains all external symbols defined in the program; and a relocation table 50 that contains a list of what symbols to relocate. In this example, the program header 42 says that the program needs shared library SL 46. The relocation table 50 shows that the program code 52 contains an instruction at address A1 that references an external symbol foo 54. In addition, the symbol table 48 shows that the program defines the external function bar 56 at address A2. Also shown in FIG. 5 is file F2 containing shared library SL 60. File F2 has the same four parts as File F: a program header 62; the code for the library program 72; a symbol table 68; and a relocation table 70. Since this shared library does not depend on any other shared libraries, the shared library list is empty 66. The relocation table 70 shows that the library code contains an instruction at address B1 that references the external symbol bar 64. In addition the symbol table 68 shows that the library code defines the external function foo at address B2 76. FIG. 6 shows a "fixed-up" version of the same program and library program which is depicted in FIG. 5. FIG. 6 shows an address space 80 containing the fixed-up program code 82 and the fixed-up library code 84. The code for the program image in File F (52 in FIG. 5) is mapped at the address 86 that is fixed for all program images. The value of this address is such that each code address in the image (52 in FIG. 5) is correct (for example, the code at address A1 (58 in FIG. 5) is mapped at address A1 in the address space 86). The shared library SL on the other hand is mapped beginning at address space location address R1 and thus each library code address is offset by R1 90 in the address space 80. The external reference to the symbol foo in the instruction A1, which was shown in the File F relocation table (54 in FIG. 5) to be at instruction A1, was satisfied by the shared library. The symbol foo was defined at address B2 in the shared library (76 in FIG. 5) and since address B2 was mapped to address R1+B2 in the Address space 80, the actual address put in A1 for foo was R1+B2 88. The external reference to the symbol bar in the instruction B1 shown by the library relocation table (64 in FIG. 5) was satisfied by the program code which defined bar at address A2 in the program image (56 in FIG. 5). The instruction at address B1 in the shared library is actually mapped to address R1+B1 in the address space 90 and so the actual address placed in the instruction at R1 +B1 is A2 92.

Figure 7:
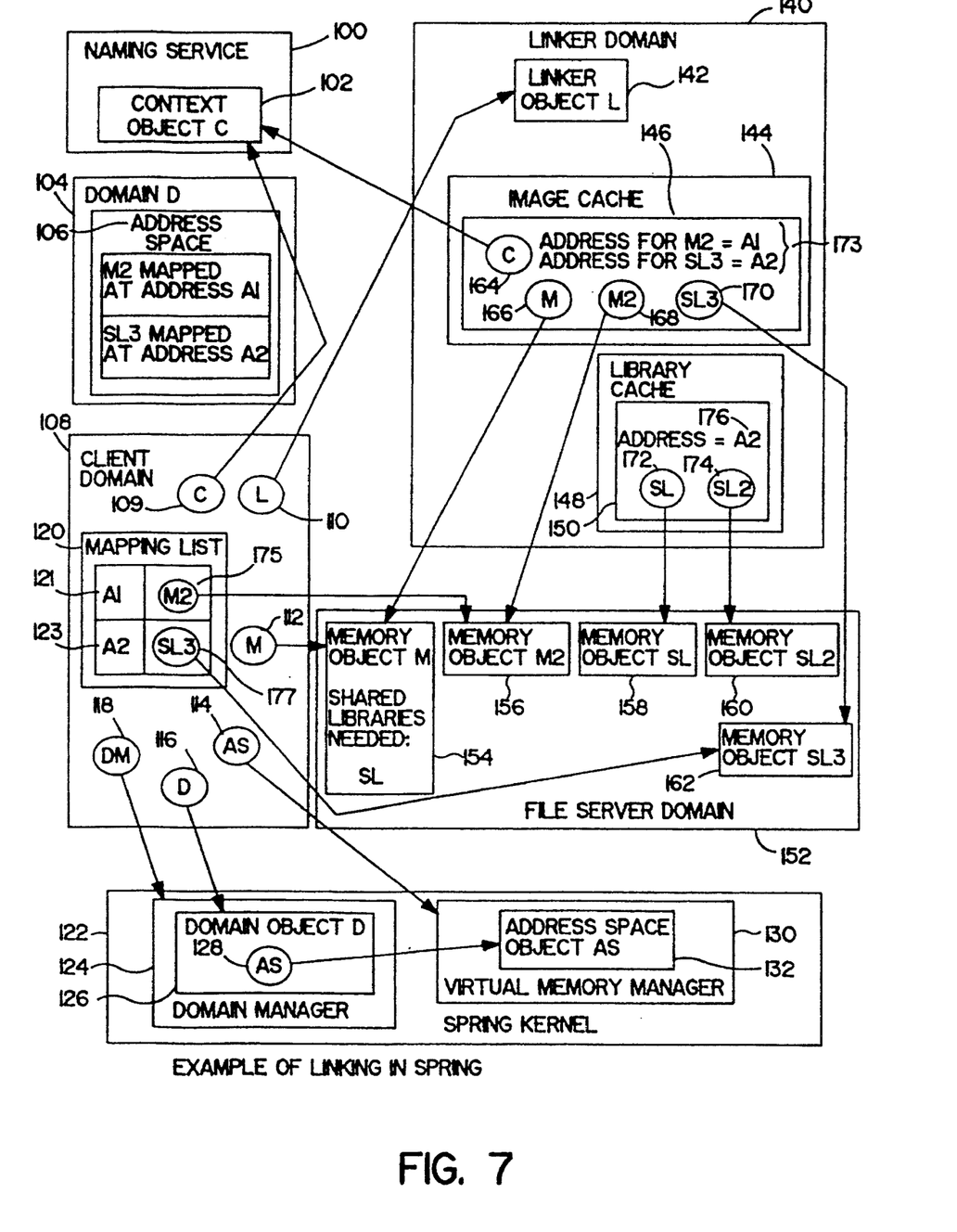
FIG. 7 illustrates an example of a SPRING dynamic linking environment.

Referring now to FIG. 7 an environment in an exemplary SPRING object oriented system is depicted with which to illustrate the preferred embodiment of the invention. Shown are: a Naming Service 100 containing an implementor for context object C 102; a Domain D 104 containing an Address Space 106; a Client Domain 108 containing a mapping list 120 and objects C 109, L 110, M 112, AS 114, D 116, and DM 118; a SPRING kernel 122, containing a Domain Manager 124 which itself contains an implementor of domain object D 126 which is shown containing object AS 128; a Virtual Memory Manager 130 also contained in the SPRING kernel which contains an address space implementor for objects A2 132; a File Server Domain 152 containing implementors for memory object M 154, memory object M2 156, memory object SL 158, memory object SL2 160 and memory object SL3 162; and finally a Linker Domain 140 containing an implementor for linker object L 142, an image cache 144 containing an exemplary cache entry 146 which itself contains a list of memory objects and related addresses 172 and Memory objects C 164, M 166, M2 168 and SL3 170, and a library cache 148 containing an exemplary cache entry 150 which itself contains memory objects SL 172 and SL2 174, and the cached program starting address 176.

It should be noted that the following objects are equivalent: M 112 and M 166; M2 175 and M2 168; SL3 177 and SL3 170; and C 109 and C 164. Two objects for the purpose of this invention are considered equivalent if they reference the source state on the server.

In the examples which follow, a client domain wishes to start a program named foo. The configuration after the program is started is shown in FIG. 7.

The simplest example is where them is a cache hit in the image cache. In this case starting the new domain goes through the following steps:

The client domain 108 looks up foo via the Spring naming service 100 and gets back a memory object M 112 that stores the program image for foo. The program image stored in M needs shared library SL in order to be dynamically linked; the names of the libraries that an image needs to be linked are stored inside memory object M 112 whose implementation is on disk 154.

The client domain 108 looks up a linker object L 110 implemented by a linker domain 140 using the naming service 100.

The client domain 108 invokes the link method on L 110 passing in two parameters: memory object M 112 and a context object C 109 implemented by the naming service 100.

The linker domain 140 looks in its cache using M 112 and C 109 as its key and discovers that it has an entry with key M 166 and C 164 that matches (M 166 is equivalent to M 112 and C 164 is equivalent to C 109). The cache entry contains a cached copy of a fully-linked version of M 166 that was linked using C 164. The fully-linked version consists of two memory objects: M2 168 and SL3 170. M2 168 is a fully linked copy of M 166 linked at address A1 (the address to map program images is fixed for all programs to be the value A1) and SL3 170 is a fully linked copy of the memory object for the shared library SL 172 linked at address A2 (the list of memory objects and corresponding linked addresses is shown at 173).

The linker domain 140 returns a list of <address to map, memory object pairs> 173 to the client domain 108 (this list is labeled mapping list 120 in the client domain 108). The first entry in the list 121 contains address A1 and memory object M2. The second entry in the list 123 contains address A2, and memory object SL3.

The client domain 108 looks up a domain manager object DM 118 using the naming service 100.

The client domain 108 invokes the create$_{13}$ domain method on object DM 118 and gets in return a new domain object D 116.

The client domain 108 invokes the get$_{13}$ address$_{13}$ space method on D 116 and gets an object AS 114 that represents D's address space 132.

The client domain 108 invokes the copy$_{13}$ and$_{13}$ map method on the AS object 114 to map object M2 175 at address A1 and SL3 177 at address A2 copy-on-write. (Note that this information was obtained from the mapping list 120).

The client domain 108 starts domain D 126 running by invoking the enter method on domain object D 116.

Note that in FIG. 7, the library cache 148 also has a cached copy of shared library SL 172 and a provisionally fixed-up version which is in memory object SL2 174. However, since we got a hit on the image cache 144 we didn't need to consult the library cache 148.

A second example is when there is no image cache hit but there is a library cache hit. For this example assume that the image cache 144 in FIG. 7 is empty when the client domain 108 tries to link the program image. The linker domain 140 does the link using the following steps:

The linker domain 140 looks up M 112 and C 109 in its image cache 144 and does not find a match.

The linker domain 140 looks in memory object M 112 and discovers that it needs a shared library program named SL to be linked.

The linker domain 140 looks up the name SL using context object C 109. (Note that this step would be repeated for each library program required). The result is the memory object SL 300 (this memory object is not shown in the linker domain 140) that contains the contents of the shared library program SL.

The linker domain 140 looks in its library cache 148 using memory object SL 300 as an argument, and discovers that it has an entry with key SL 172 that watches (i.e., SL 172 is equivalent to SL 300). The cached entry contains a cache copy of a provisionally fixed-up version of shared library SL which is memory object SL2 174.

The linker domain 140 creates a memory object M2 168 that is a copy-on-write copy of M 112 and creates a memory object SL3 170 that is a copy-on-write copy of SL2 174.

The linker domain 140 resolves all unresolved references in M2 168 using SL3 170 and resolves all unresolved references in SL3 170 using M2 168 (how this is done was described above and is depicted in the flow chart). The result is that M2 168 and SL3 170 comprise a fully-linked version of programfoo. Again, it should be noted that if there were multiple library programs required, the same steps would be performed for each one.

The linker domain enters M2 168 and SL3 170 into its image cache 144 along with their related keys (memory object C 164 and memory object M 166) and returns a list of <address to map, memory object pairs> 173 to the client domain 108 (this list is labeled mapping list 120 in 108). The first entry in the list 121 contains address A1 and memory object M2 and the second entry in the list 123 contains address A2 and memory object SL3.

The client domain 108 then follows the same steps in the first example to create the new domain.

The last example is when there is no image or library cache hit. For this example assume that when the client domain 108 tries to link the program image, the image cache 144 and the library cache 148 are empty. The linker domain 140 does the link using the following steps:

The linker domain 140 looks up M 112 and C 109 in its image cache 144 and does not find a match.

The linker domain 140 finds memory object M 112 and maps it into its address space, and discovers that M 112 needs a shared library named SL to be linked.

The linker domain 140 looks up the name SL using context object C 109. The result is the memory object SL 172 that contains the contents of the shared library program SL.

The linker domain 140 looks in its library cache 148 using memory object SL 172 as the argument, and does not find a match (recall that in this example, we assumed the library cache to be empty).

The linker domain 140 decides that memory object SL 172 must be fixed-up at an available address in its address space (call it A2).

The linker domain 140 creates a memory object SL2 160 that is a copy-on-write copy of SL 172 and maps SL2 into its address space.

The linker domain 140 provisionally fixes-up SL2 (see the discussion on fix-ups above and the detailed flow-chart in FIG. 4 for details) and stores SL2 174 in the library cache (along with its key SL 172).

The linker domain 140 creates a memory object M2 168 that is a copy-on-write copy of M 112 and creates a memory object SL3 170 that is a copy-on-write copy of SL2 174.

The linker domain 140 resolves all unresolved references in M2 168 using SL3 170 and resolves all unresolved references in SL3 170 using M2 168 (how this is done is explained in the discussion on fix-ups above and in the detailed flow chart in FIG. 4). The result is that M2 and SL3 170 comprise a fully-linked version of program foo.

The linker domain 140 enters M2 168 and SL3 170 into its image cache 144 (along with its key, memory object M166 and its context object C 164) and returns a list 172 of <address to map, memory object pairs> to the client domain 108. The first entry of the list 121 contains address A1 and memory object M2. The second entry in the list 123 contains address A2 and memory object SL3.

The client domain 108 then followed the same steps as above in the first example, to create the new domain 104.

An alternative embodiment of the invention is to use only the shared library program cache in the dynamic linker system, following the same steps as outlined above starting with the second example.

While the above examples describe the presently preferred embodiment, and describe specific program domains and a certain sequence of steps, those skilled in these arts will recognize that these specifics are not essential to the practice of the invention which basically embodies the use of caches for retaining fully linked images of programs and their associated libraries as well as partially fixed-up library routines with which to minimize the overall dynamic linking overhead cost.

What is claimed is:

1. A method of efficiently generating a fully-linked program image of a designated program and related library programs using a dynamic linking system having an image cache, the method implemented in a computer system, the method including the steps of:

invoking said linking system with parameters representing an unlinked program image of said designated program;

searching for said fully-linked program image of said designated program and said related library programs in said image cache; and if said fully-linked program image is found in said image cache, then the method further includes the steps of:

retrieving said fully-linked program image with a list of program identifiers and related addresses for each said related library program from said image cache; and mapping said fully-linked program image of said designated program and each of said related library programs at said addresses from said list of program identifiers.

2. The method of claim 1 wherein if the fully-linked program image is not found in said image cache, the method further comprises the steps of:

generating an unlinked copy of said designated program;

searching for a provisionally fixed-up copy of said related library programs in a library cache of said linking system; and if said provisionally fixed-up library programs is found in said library cache, then the method further including the steps of:

retrieving said provisionally fixed-up library programs from said library cache;

linking said provisionally fixed-up library, programs with each other and with said unlinked designated program to create said fully linked program image of said designated program and related library programs with a list of program identifiers and related addresses comprising an identifier and related address for said designated program and for each of said related library programs; and mapping said fully-linked program image of said designated program and each of said provisionally fixed-up library programs at said related addresses from said list of program identifiers.

3. The method of claim 2 wherein if said provisionally fixed-up library programs is not found in said library cache, then the method further comprises the following steps:

selecting an address to which to link related library programs;

generating an unlinked copy of said related library programs;

provisionally fixing-up relocation symbols in said copy of said related library programs;

linking said provisionally fixed-up library programs with each other and with said unlinked designated program to create said fully linked program image of said designated program and related library programs with a list of program identifiers and related addresses comprising an identifier and related address for said designated program and for each of said related library programs;

mapping said fully-linked program image of said designated program and each of said related library programs at said related addresses from said list of program identifiers; and adding said provisionally fixed-up library programs to said library cache.

4. The method of claim 3 wherein if said program image is not found in said image cache then the method further comprises the steps of:

adding to said image cache said fully-linked program image with said provisionally fixed-up library programs and said list of program identifiers and related addresses for subsequent retrieval by said linking system.

5. The method of claim 4 wherein all programs are object oriented programs.

6. A method of efficiently generating a fully-linked program image of a designated program and related library programs using a dynamic linking system having a library cache and an image cache, the method being implemented in a computer system, the method including the steps of:

invoking said linking system with parameters representing an unlinked program image of said designated program;

searching for said fully-linked program image of said designated program and said related library programs in said image cache; and if said fully-linked program image is not found in said image cache, then the method further including the steps of:

generating an unlinked copy of said designated program;

searching for a provisionally fixed-up copy of said related library programs in said library cache; and if said provisionally fixed-up library programs is found in said library cache, then the method further including the steps of:

retrieving said provisionally fixed-up library programs from said library cache;

linking said provisionally fixed up library programs with each other and with said unlinked designated program to create said fully linked program image of said designated program and related library programs with a list of program identifiers and related addresses comprising an identifier and related address for said designated program and for each of said related library programs; and mapping said fully-linked program image of said designated program and each of said provisionally fixed-up library programs at said related addresses from said list of program identifiers.

7. The method of claim 6 wherein if the provisionally fixed-up library programs is not found in said library cache, then the method further comprises the following steps:

selecting an address to which to link related library programs;

generating an unlinked copy of said related library programs;

provisionally fixing-up relocation symbols in said copy of said related library programs;

linking said provisionally fixed-up library programs with each other and with said unlinked designated program to create said fully linked program image of said designated program and related library programs with a list of program identifiers and related addresses comprising an identifier and related address for said designated program and for each of said related library programs;

mapping said fully-linked program image of said designated program and each of said related library programs at said related addresses from said list of program identifiers; and adding said provisionally fixed-up library programs to said library cache.

8. The method of claim 7 wherein all programs are object oriented programs.

9. The method of claim 1 wherein said step of searching for said fully-linked program image in said image cache comprises the step of:

checking said image cache for a key which matches said designated program and said related library programs.

10. The method of claim 2 wherein said step of searching for a provisionally fixed-up copy of said related library programs includes the additional steps of:

creating a first name list containing names of said library programs which are related to said designated program; and resolving each of said names of said library programs contained on said first list into a library program identifier and adding each of said library program identifiers to a second list.

11. The method of claim 10 wherein said step of retrieving said provisionally fixed-up library programs includes the additional steps of:

checking said library cache for a match for each library program identifier in said second list;

obtaining a matching library program from said library cache in the event that a matching library program identifier is found; and adding said matching library program identifier from said library cache to a third list.

12. The method of claim 11 comprising the additional steps of: selecting an address to which to link related library programs identified in said second list in the event that a matching library program identifier is not found in said library cache;

generating an unlinked copy of said related library programs;

provisionally fixing-up relocation symbols in said copy of said related library programs;

linking said provisionally fixed-up library programs with each other and with said unlinked designated program to create said fully linked program image of said designated program and related library programs with a list of program identifiers and related addresses comprising an identifier and related address for said designated program and for each of said related library programs;

adding said provisionally fixed-up library programs to said library cache; and adding said provisionally fixed-up library program identifier to said third list.

13. The method of claim 12 comprising the additional steps of:

making a copy of said program image and adding an identifier of said copy of said program image to a fourth list, said copy of said program image having a symbol table and a relocation table; and making a copy of each of said library programs from said third list and adding an identifier of said copy of said library programs to said fourth list, each of said copies of said library programs having a symbol table and a relocation table.

14. The method of claim 13 comprising the additional steps of:

finding each symbol to be relocated in said copy of said program image; and searching all of said library programs identified in said fourth list and in the event that a first symbol definition which matches said symbol to be relocated is found, using an address of said first symbol definition which matches said symbol to be relocated, to perform a relocation for said symbol to be relocated.

15. The method of claim 14 comprising the additional steps of:

using said symbol table in each of said library programs identified in said fourth list in turn, starting with a first of said library programs identified in said fourth list, comparing each symbol of said symbol table to said program image's symbol table and marking a symbol in said library program's symbol table as overridden in the event that said symbol matches a symbol in said program image's symbol table;

comparing each symbol of each of said symbol tables to all of said symbol tables of said library programs identified in said fourth list which are higher in said fourth list than said symbol table being checked and which have been marked as already checked;

upon completion of the check of said symbol table of each of said library program identified in said fourth list, marking said library program's identifier in said fourth list as one whose symbol table has been checked; and comparing said symbols in said symbol tables in each of said library programs identified in said fourth list in like manner until all of said symbol tables have been compared.

16. The method of claim 15 comprising the additional steps of:

using said relocation table in each of said programs identified in said fourth list in turn, starting with a first of said programs identified in said fourth list, scanning each of said relocation tables to find an undefined symbol;

in the event that a symbol in one of said relocation tables is a defined symbol, checking said defined symbol and in the event said defined symbol has been marked as overridden, undoing a relocation address for said defined symbol which has been marked as overridden;

using each undefined symbol and each defined symbol whose relocation address was undone, as a search argument, checking said symbol table of said copy of said program image and said symbol tables of each of said library programs identified in said fourth list to find a symbol matching said search argument, and in the event said matching symbol is found, using said found symbol's address to perform said address relocation for said symbol which was used as said search argument; and providing an exception message in the event no symbol is found to match said search argument.

17. The method of claim 16 comprising the additional steps of:

creating a cachable list of program identifiers, containing a copy of said designated program image and each of said library programs identified in said fourth list;

entering said cachable list of program identifiers into said image cache; and returning said cachable list of program identifiers in response to said linking system.

18. The method of claim 17 wherein said programs are objects and said computing system is an object oriented system.

19. The method of claim 18 wherein said identifiers and said program identifiers are memory objects.

20. A method of efficiently generating a fully-linked program image of a designated program and related library programs using a dynamic linking system having a library cache and an image cache, the method being implemented in a computer system, the method including the steps of:

invoking said linking system with parameters representing an unlinked program image of said designated program;

searching for said fully-linked program image of said designated program and said related library programs in said image cache; and if said fully-linked program image is not found in said image cache, then the method further including the steps of:

checking a library cache for a provisionally fixed-up copy of said related library programs and in the event that said library cache contains said provisionally fixed-up related library programs retrieving said provisionally fixed up library programs; and if said provisionally fixed up library programs is not found in said library cache, then the method further including the steps of:

creating a list of library program identifiers and related addresses from said library cache;

linking each of said library programs to each other and to said program image to create said fully-linked program image; and mapping said fully-linked program image identified by said program identifiers at said related address from said list of program identifiers.

21. The method of claim 20 wherein said step of creating a list of library program identifiers and related addresses from said library program cache comprises the additional steps of:

creating a first list containing names of said library programs which are related to said designated program;

resolving each of said names of said library programs contained on said first list into a library program identifier and adding each of said library program identifiers to a second list;

checking said library cache for a match for each library program identifier in said second list;

obtaining a matching library program from said library cache in the event that a matching library program identifier is found; and adding said matching library program identifier from said library cache to a third list.

22. The method of claim 21 comprising the additional steps of:

selecting an address to which to link related library programs identified in said second list in the event that a matching library program identifier is not found in said library cache;

generating an unlinked copy of said related library programs;

provisionally fixing-up relocation symbols in said copy of said related library programs;

adding said provisionally fixed-up library programs to said library cache; and adding said provisionally fixed-up library program identifier to said third list.

23. The method of claim 22 comprising the additional steps of:

making a copy of said program image and adding an identifier of said copy of said program image to a fourth list, said copy of said program image having a symbol table and a relocation table; and making a copy of each of said library programs from said third list and adding an identifier of said copy of said library programs to said fourth list, each of said copies of said library programs having a symbol table and a relocation table.

24. The method of claim 23 comprising the additional steps of:

finding each symbol to be relocated in said copy of said program image; and searching all of said library programs identified in said fourth list and in the event that a first symbol definition which matches said symbol to be relocated is found, using an address of said first symbol definition which matches said symbol to be relocated, to perform a relocation for said symbol to be relocated.

25. The method of claim 24 comprising the additional steps of:

using said symbol table in each of said library programs identified in said fourth list in turn, starting with a first of said library programs identified in said fourth list, comparing each symbol of said symbol table to said program image's symbol table and marking a symbol in said library program's symbol table as overridden in the event that said symbol matches a symbol in said program image's symbol table;

comparing each symbol of each of said symbol tables to all of said symbol tables of said library programs identified in said fourth list which are higher in said fourth list than said symbol table being checked and which have been marked as already checked;

upon completion of the check of said symbol table of each of said library program identified in said fourth fist, marking said library program's identifier in said fourth list as one whose symbol table has been checked; and comparing said symbols in said symbol tables in each of said library programs identified in said fourth list in like manner until all of said symbol tables have been compared.

26. The method of claim 25 comprising the additional steps of:

using said relocation table in each of said programs identified in said fourth list in turn, starting with a first of said programs identified in said fourth list, scanning each of said relocation tables to find an undefined symbol;

in the event that a symbol in one of said relocation tables is a defined symbol, checking said defined symbol a second time and in the event said defined symbol has been marked as overridden, undoing a relocation address for said defined symbol which has been marked as overridden;

using each undefined symbol and each defined symbol whose relocation address was undone as a search argument, checking said symbol table of said copy of said program image and said symbol tables of each of said library programs identified in said fourth list to find a symbol matching said search argument, and in the event said matching symbol is found, using said found symbol's address to perform said address relocation for said symbol which was used as said search argument; and providing an exception message in the event no symbol is found to match said search argument.

27. The method of claim 26 comprising the additional steps of:

creating a cachable list of program identifiers, containing a copy of said designated program image and each of said library programs identified in said fourth list; and returning said cachable list of program identifiers in response to said linking system.

28. The method of claim 27 wherein said programs are objects and said computing system is an object oriented system.

29. The method of claim 28 wherein said identifiers and said program identifiers are memory objects.

30. An image caching system for providing a fully-linked program image of a designated program and related library programs to a dynamic linking system, the caching system being implemented in a computer system, the image caching system comprising:

an image cache for caching said fully-linked program image with a list of program identifiers and related addresses for each said related library program, said list for mapping said fully-linked program image;

a first searching facility, coupled to said image cache, for searching said image cache to determine whether said image cache contains said fully-linked program image, said search being made in response to a request to link said designated program; and a first communications facility, coupled to said first searching facility, for responding to said request to link said designated program, said response containing said list of program identifiers and addresses related to said program identifiers obtained from said image cache in the event that said fully linked-program image is found in said image cache.

31. The image caching system as recited in claim 30 further comprising:

a library cache, coupled to said image cache, for caching provisionally fixed-up library programs; and a second searching facility, coupled to said library cache, for searching said library cache to determine whether at least one of said provisionally fixed-up library programs matches at least one of said related library programs.

32. The image caching system as recited in claim 31 wherein said search of said library cache is made in the event that said fully-linked program image is not found in said image cache which matches said designated program, and wherein said first searching facility obtains an unlinked copy of said designated program.

33. The image caching system as recited in claim 32 further comprising:

a first linking facility, coupled to said second searching facility, for linking a found library program to said unlinked program image, in the event that at least one of said provisionally fixed-up library programs is found in said library cache which matches at least one of said related library programs.

34. The image caching system as recited in claim 33 further comprising:

a third searching facility, coupled to said second searching facility, for finding unlinked library programs in the event that a library program is not found in said library cache which matches said related library programs; and a second linking facility, coupled to said third searching facility, for linking said unlinked library programs to each other and to said found library programs and to said unlinked program image, producing fully-linked program image of said designated program with related library programs.

35. The image caching system as recited in claim 34 wherein:

said second linking facility provisionally fixes-up any of said unlinked library programs and stores said provisionally fixed-up library programs in said library cache; and said second linking facility stores said fully-linked program image with related library programs in said image cache.

36. The image caching system as recited in claim 35 wherein said designed program and library programs are object oriented programs.

37. An image caching system for providing provisionally fixed-up library programs to a dynamic linking system for linking with an unlinked program image of a designated program to create a fully-linked program image, of said designated program, the caching system being implemented in a computer system, the image caching system comprising:

a library cache for caching provisionally fixed-up library programs;

a first searching facility, coupled to said library cache, for searching said library cache to determine whether at least one of said provisionally fixed-up library programs matches at least one of said related library programs, said search being made in response to a request to link said designated program when said fully-linked program image of said designated program is not found by the dynamic linking system; and a first linking facility, coupled to said first said searching facility, for linking a found library program to said designated program, in the event that said found library program is found in said library cache.

38. The image caching system as recited in claim 37 wherein said first searching facility further comprises:

a second searching facility, coupled to said library cache, for searching said library cache to determine whether said library cache contains an unlinked library program which matches one of said related library program.

39. The image caching system as recited in claim 37 further comprising:

a second searching facility, coupled to said memory of said computer, for finding said unlinked library programs which matches said related library programs; and a second linking facility, coupled to said second searching facility, for linking said unlinked library programs to each other and to said found library programs and to said unlinked copy of said designated program, producing a fully-linked program image of said designated program with related library programs.

40. The image caching system as recited in claim 39 wherein:

said second linking facility provisionally fixes-up any of said unlinked library programs and stores said provisionally fixed-up library programs in said library cache.

41. The Dynamic Linking system as recited in claim 40 wherein said library programs in said library program cache are partially linked library programs.

42. The Dynamic Linking system as recited in claim 41 wherein said application programs and said library programs are object oriented programs.

\* \* \* \* \*